United States Patent [19]

Johnston

[11] 4,267,196
[45] May 12, 1981

[54] FOOD FROM NON-EDIBLE FRUIT BY-PRODUCTS AND METHOD FOR PRODUCTION

[76] Inventor: Ian F. Johnston, 4001 Westerly Pl., Suite 106, Newport Beach, Calif. 92660

[21] Appl. No.: 963,816

[22] Filed: Nov. 27, 1978

Related U.S. Application Data

[63] Continuation of Ser. No. 830,127, Sep. 2, 1977, abandoned.

[51] Int. Cl.³ ............................................. A23L 1/212
[52] U.S. Cl. ..................................... 426/49; 426/616; 426/640; 426/615
[58] Field of Search ............... 426/616, 333, 473, 640, 426/49, 615

[56] References Cited

U.S. PATENT DOCUMENTS

| Re. 22,865 | 4/1947 | Vincent | 426/616 |
|---|---|---|---|
| 2,362,014 | 11/1944 | Lissauer | 426/616 |
| 2,548,510 | 4/1951 | Neal | 426/616 |
| 3,259,508 | 7/1966 | Aguirre et al. | 426/473 |
| 3,692,546 | 9/1972 | Dolev et al. | 426/333 |

FOREIGN PATENT DOCUMENTS

491076  3/1953  Canada ...................................... 426/33

Primary Examiner—Joseph M. Golian
Assistant Examiner—Elizabeth A. Hatcher
Attorney, Agent, or Firm—Christie, Parker & Hale

[57] ABSTRACT

Palatable and edible food products are prepared from a fruit precursor comprising substantially non-edible and substantially non-palatable portions of fruits by comminuting the precursor and digesting the comminuted precursor by combining an edible, water-soluble digesting agent with the comminuted precursor. The digesting agent serves to adjust the pH of the precursor to a value at which the precursor cells rupture and enzymes in the precursor are active.

Thereafter, the digested precursor is neutralized by changing the pH of the digested precursor with an edible, water-soluble neutralizing agent to about the value of the pH of the comminuted precursor prior to digestion. Fruits for which this process can be used include citrus fruits, pineapple, banana, papaya, mango, and combinations thereof.

37 Claims, 1 Drawing Figure

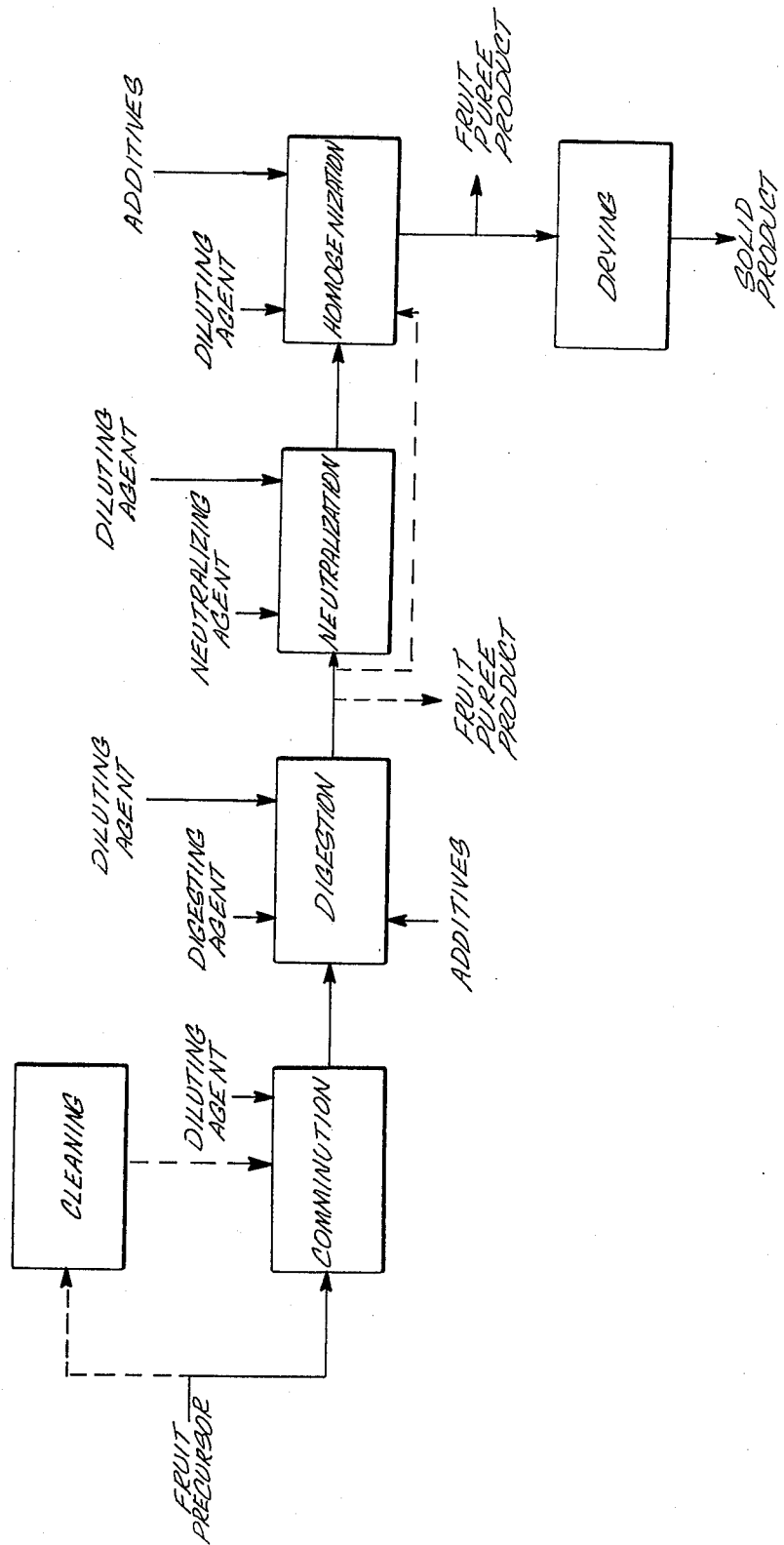

FOOD FROM NON-EDIBLE FRUIT BY-PRODUCTS AND METHOD FOR PRODUCTION

This is a continuation of application Ser. No. 830,127, filed Sept. 2, 1977 and now abandoned.

CROSS REFERENCES

Reference is herein made to my co-pending U.S. patent application Ser. No. 708,280 filed on July 23, 1976, entitled "Edible Fruit Precursor Fruit Products and Methods".

The examples presented in the Ser. No. 708,280 application are incorporated herein by this reference.

BACKGROUND OF THE INVENTION

This invention pertains to food products and processes, particularly those made from fruit products including whole fruits and selected normally non-edible portions.

In the fruit processing industry, substantial portions of fruit parts and substantial quantities of "cull" fruits are discarded as waste by-products. Examples of such waste by-products include the "cups" of citrus fruits, plus whole citrus residual solids; the skin and core of pineapple; whole banana, including peel, and stalks, ripe, over-ripe and immature "green" bananas; mango skin and seeds; and papaya skin and seeds. The lack of existing food processes or formulations or other applications for these by-products results in little utilization of these by-products. For some of these by-products, such as citrus fruit and pineapple centrifuge underflow, disposal of the liquid and semisolid by-products without contributing to pollution is a problem. Nevertheless, these by-products, such as fruit skins, pith, and seeds have higher nutritional properties, including higher available amino acids, minerals, fiber, and vitamin content, than the normally regarded edible portions.

These products are generally overlooked for human food products because they lack agreeable taste and texture. Orange and other citrus peels have been little used, for humanly edible foods, with minor exceptions such as in candied peel and marmalade. With food shortages imminent as world population continues to explode, discarding these by-products is a waste of natural resources.

The primary disagreeable bitterness in citrus solids is believed to result from the bitterness of a substance known as d-limonin. Nullifying the bitter effects of d-limonin would contribute to greater use of the entire citrus fruit.

Therefore, there is a need for a method for preparing palatable and edible food products for human consumption from those portions of fruit which are normally discarded because they are non-palatable and/or regarded non-edible.

SUMMARY

There are provided by this invention food products with the above features. These food products, which are palatable, edible, and suitable for human consumption, are prepared from a fruit precursor comprising substantially non-edible and substantially non-palatable portions of fruit selected from the group consisting of citrus fruits, pineapple, banana, papaya, and mango. The food products comprise on a dry basis from about 70 to about 90% higher carbohydrates, from about 1% to about 7% crude fiber, and greater than about 3% available amino acids, and usually from about 5 to about 7.5% by weight available amino acids.

The fruit precursors from which the food products are produced contain amylytic enzymes and have cells comprising higher carbohydrates. The food products are produced by comminuting the precursor to a weight average particle size of less than about 40 mesh, and digesting the comminuted precursor by combining an edible, water-soluble digesting agent with the comminuted precursor to adjust the pH of the precursor to a value at which the precursor cells rupture, and amylytic enzymes in the precursor are active. To avoid degradation of the product, preferably the digested precursor is neutralized by changing the pH of the digested precursor with an edible, water-soluble neutralizing agent to about the value of the pH of the comminuted precursor prior to digestion. If a dehydrated product is desired, the neutralized precursor can be dried.

DRAWING

These and other features, aspects and advantages of the present invention can be better understood with reference to the appended claims, following description, and accompanying Drawing which is a block diagram of a process for making an edible food product in accordance with this invention.

DESCRIPTION OF THE INVENTION

With reference to the accompanying Drawing, in general, the present invention is directed to a method for preparing a palatable and edible food product for human consumption from a fruit precursor comprising substantially non-edible and substantially non-palatable portions of fruit. In the Drawing, dashed lines indicate process steps which are not preferred. Thus, the fruit precursor can be sterilized if necessary in a cleaning stage. From the cleaning stage, the precursor is passed to a comminution stage to comminute the precursor to a weight average particle size of less than about 40 mesh. The comminuted precursor is then digested in a digestion stage by combining the comminuted precursor with an edible, water-soluble digesting agent to adjust the pH of the precursor to a value at which the precursor cells comprising higher carbohydrates rupture and amylytic enzymes in the precursor are active. Digestion and comminution can be effected simultaneously in a single comminution/digestion stage.

A fruit puree can be withdrawn at this point, but it is preferred to subject the digested precursor to neutralization in a neutralization stage by changing the pH of the digested precursor with an edible, water-soluble neutralizing agent to about the value of the pH of the comminuted precursor prior to digestion. This serves to maximize the flavor of the product. The neutralized precursor is then subjected to homogenization in a homogenization stage, although the product from the digestion stage can by-pass the neutralization stage and pass directly to homogenization. Neutralization and homogenization can be effected simultaneously by adding the neutralization agent to the homogenization stage. As required for viscosity control, diluting agent can be added at any stage. Also, food grade additives can be included as desired at any stage. The slurry from the homogenization stage can be utilized as a fruit puree product, or can be dried in a drying stage to produce a solid product.

The steps of the process are generally conducted at atmospheric pressure and at ambient temperature. Temperatures below freezing should be avoided. High temperatures can be desired for accelerating the enzymatic reactions undergone by the precursor during this process, but temperatures greater than 45° C. are to be avoided because of possible thermal degradation of flavoncids of the percursor and resulting off-taste in the product. All the steps of the process can be conducted under an inert atmosphere such as under nitrogen gas to avoid oxidation of the precursor. An advantage of conducting the process under an atmosphere of nitrogen gas is that the nitrogen can be absorbed by the precursor, and the absorbed nitrogen can serve to prevent oxidation and thermal degradation.

The fruit precursor comprises substantially non-edible and substantially non-palatable portions of a fruit selected from the group consisting of citrus fruits, pineapple, banana, papaya, mango, and combinations thereof. Each of these fruits contains complex enzyme systems and has cells comprising higher carbohydrates, and primarily cellulose. Included in the enzyme systems are enzymes such as cellulase, hydrolase, esterase, proteolvsis, glycogensis, and amylytic enzymes such as amylase.

Suitable citrus fruits include orange, grapefruit, tangelo, tangerine, lemon, kinnow fruit, and varietals. When dealing with citrus by-product parts, citrus "cups" can be used. Cups are halves of the outer portion of citrus fruit comprising the skin (flavedo), the pith (albedo), and adherent internal sacs, membrane, and seed, referred to as rag. The cups are also referred to as whole citrus fruit residuals (WCFR), and represent the portion of citrus fruit remaining after conventional juice extraction. If desired, whole citrus fruit without juice extraction can be used.

For pineapple, the "zenith" solids, which comprise the outer skin and inner core of pineapple, can be used. Also, whole pineapple can be used.

For bananas, the entire banana can be used, including the skin, stalk, flesh and seeds. The skin, stalk, and seeds can be used without the flesh. Green bananas, ripe bananas, and over-ripe (enzymatically browned) bananas can be the fruit precursor.

When papaya is the precursor, the whole papaya, including the seed, or just the flesh and skin, can be processed. When the seed is included, the resultant product has a higher fiber content of about 6.3%.

Likewise, mangos can be processed with and without the seed.

Also, combinations of various of these fruits can be used. For example, pineapple can be added to citrus cups to increase the fiber content of the product. However, fruits which are subjected to alkaline digestion (described below) and fruits subjected to acidic digestion (described below) cannot be combined until after digestion is complete.

Thus, it can be seen that the fruit precursor subjected to the process of this invention includes by-product components of fruit which are normally discarded as unwanted by-products and not previously processed for human consumption. These by-products are discarded because of their lack of aesthetic appeal, and often because of inedible texture and unsatisfactory taste which, depending on the fruit, can be unpalatably pungent, bitter or bland. By the process of the present invention, these by-products are converted into a food product which has an edible texture and a palatable, and in most cases, delectable taste and high nutritional value.

Each step of the process shown in the Drawing will now be described in detail.

The cleaning operation is required only if the fruit parts are contaminated and have not already been subjected to cleaning. For example, citrus cups generally are sufficiently clean to be introduced directly to the comminution stage. Hygienic handling of the fruit precursor is required for human consumption. Care must be taken to insure that any pesticides and infestation residues on the outer fruit parts have been sufficiently eliminated. Microbiological tests should be conducted. An in-line washing conveyor, sorting belt, and cutting machine (not shown) can be used for inspection and cleaning of fruit. If necessary, the fruit precursor can be soaked in water tanks (not shown), which can contain sterilizing and/or surfactant agents to insure removal of any residual contamination on the outer fruit parts. A spray or jet-type of rinse cycle can be used to remove contaminants from the fruit precursor after the fruit precursor is withdrawn from the water tanks.

In the comminution stage, the fruit precursor is comminuted to a sufficiently small size so that components of the fruit can be subjected to enzymatic reactions of the digestion stage. It has been found that if the fruit precursor is comminuted to a weight average particle size of less than about 40 mesh, more rapid digestion can be obtained. If the final product is to be dried to form a solid product by spray drying, for efficient spray drying, it is preferred that the fruit precursor be comminuted to a weight average particle size of less than about 80 mesh. Reducing the particle size of the fruit precursor to a weight average particle size of less than about 120 mesh can be unnecessary because the extra energy required for such comminutation gains little, if anything, in rate of digestion of the precursor. Thus, it is preferred that the fruit precursor be comminuted to a weight average particle size of from about 40 to about 120 mesh. It has been found that comminution for about 5 to about 10 minutes in a vertical cutter mixer (VCM) results in satisfactory comminution of the precursor.

As used herein, the term "comminution" refers to any physical act of size reduction, including, but not limited to chopping, crushing, tearing, shredding, maceration, and grinding by suitable machinery.

By the action of the comminution equipment, the fruit precursor is reduced to a slurry or puree composition. The preferred comminution equipment is a VCM, with blades rotating at 3500 revolutions per minute. Also, a colloid mill or a disc mill can be used for comminution.

By such comminution, the precursor is in the form of a puree or slurry having a substantially smooth and even consistency, with the cellular structure opened up and flavonoids, minerals, vitamins and cellulolytic enzymes released and solubilized.

Throughout this process, a diluting agent can be added to the precursor to maintain the viscosity of the comminuted precursor sufficiently low for ease of processing. All viscosity values presented herein are based on viscosity measured at processing temperature. Preferably the viscosity is maintained less than about 1200 cps (centipoise) for ease of processing. Therefore, as shown in the Drawing, if necessary, a diluting agent can be added to each, all, or any combination of the comminution, digestion, neutralization, and homogenization stages. The amount of diluting agent added during the process is minimized, and preferably is completely avoided, because water added to the product adds primarily bulk with little, if any nutritional value, and in the case of a dried product, energy must be expended to remove the water.

Preferably the viscosity of the comminuted precursor throughout the process is maintained greater than 800 cps because the addition of water to reduce it below 800 cps does not sufficiently aid in processing to overcome the disadvantages of diluting the product of this process. Therefore, preferably the viscosity of comminuted precursor throughout the processes is maintained between about 800 and about 1200 cps.

As used herein, the term "diluting agent" refers to water, which may or may not contain other edible components. For example, the diluting agent can be a sugar solution or dilute syrup, or preferably fruit processing slurries from secondary juice extractors and/or centrifuge underflow fine particles. These fruit processing slurries typically contain from about 6 to about 14% fruit solids. Advantages of adding these fruit processing slurries as the diluting agent include incorporation of what otherwise would be waste product from fruit processing, thereby avoiding pollution and disposal problems of these slurries, and incorporation of the flavonoids and mineral content contained in these slurries into the final product.

The pH of the precursor after comminution and before digestion depends on the fruit being processed, and can vary from batch to batch of fruit. The last column of Table I, labelled "post-neutralization pH", presents typical values of about 1.9 to about 5.2 for the pH of various precursor fruits before digestion.

Quality and microbiological tests can be conducted after comminution, and/or at any stage of the process, to insure that the fruit puree is free of contamination and is edible to human food grade standards.

In the digestion stage, the comminuted precursor is digested by combining an edible, water-soluble digesting agent with the comminuted precursor for adjusting the pH of the precursor to a value at which precursor cells rupture and amylytic enzymes in the precursor are activated so as to hydrolyze, by amylolysis, polysaccharides in the fruit precursor to complex sugars.

TABLE I

| Precursor Fruit | Type of Process | Digesting pH | Post-Neutralization pH |
|---|---|---|---|
| Citrus | Alkaline | 7+ -8.2 | 2.6-3.3 |
| Banana (green) | Alkaline | 7+ -8.2 | about 5.2 |
| Pineapple | Alkaline | 7+ -8.2 | 1.9-3.8 |
| Mango with seed | Alkaline | 7+ -8.2 | about 4.3 |
| Banana (ripe) | Acidic | 2.9-3.9 | about 5.2 |
| Papaya | Acidic | 2.5-3.7 | about 3.8 |
| Mango without seed | Acidic | 2.9-3.9 | about 4.3 |

The digesting agent can be added to the comminuted precursor without dilution, or it can be combined with an aqueous medium.

Preferably the digestion is initiated simultaneously with comminution of the precursor. This can be effected by adding the digesting agent directly to the equipment used for comminution. By using the same equipment for these two steps, capital and operating costs are minimized.

Two different types of digestion steps are used in the present invention. These are an acidic digestion process and an alkaline digestion process. The type of digestive step used depends on the type of fruit being processed. For citrus fruits, green banana, pineapple, and mango with seed, the alkaline process is used, as indicated in Table I. For ripe bananas, papaya, and mango with seed the acidic process is used.

"Ripe" bananas are bananas that have started to turn yellow, and "green" bananas are bananas that have not yet turned yellow.

The alkaline digestive process step involves adding sufficient edible, water-soluble base to the comminuted precursor slurry to raise the pH of the slurry to a value greater than 7 and less than 8.2, i.e., digestion is effected in an alkaline medium. Such an alkaline medium activates the amylytic enzymes in these fruits. Increasing the pH to a value greater than 8.2 is undesirable because it can in some cases deactivate amylytic enzymes. The preferred pH is about 7.5, because increasing the pH to a value greater than 7.5 has little or no effect on digestion rate, and a pH of 7.5 provides a sufficient margin of safety so that the pH of the slurry does not drop to 7.0 or lower.

Suitable basic digesting agents include sodium bicarbonate, sodium carbonate, calcium carbonate, potassium bicarbonate, potassium carbonate, and combinations thereof. The preferred basic digesting agent is sodium bicarbonate because it is readily available, and has approval by the Federal Food and Drug Administration as a food additive.

For ripe bananas and mango without seed, sufficient acidic digesting agent is added to reduce the pH of the precursor to a value of from about 2.9 to about 3.9. For papaya, sufficient acidic digesting agent is added to reduce the pH of the papaya to a value of from about 2.5 to about 3.7. Suitable edible, acidic digesting agents include ascorbic acid, lactic acid, acetic acid, citric acid, malic acid, and combinations thereof. Ascorbic acid is the preferred acid because it serves to increase the vitamin C content of the food product.

For optimum amylytic enzyme activity with mangos, preferably the acidic process is used. However, for mango with seed, it is necessary to use the alkaline process to obtain rupturing of the seed material because the seed material has a high hemi-cellulose content.

Digestion is conducted for a sufficient time to maximize the sweetness of the precursor as the amylytic enzymes catalyze conversion of amylose to fructose, and for a sufficient time to effect neutralization of d-limonin in the fruit in the case of citrus fruit. The precursor usually is digested to contain about 6 to about 12% by weight fructose. Digestion can be monitored by analyzing the precursor for sugar content, or by taste. To achieve fructose content of 6 to 12%, digestion can be conducted for a time of from about 5 to about 15 minutes. It has been found that it is possible to effect digestion for up to about 80 minutes by combining an oxdiation inhibitor such as soya isolate with the precursor. If digestion is permitted to occur for too long a time, degradation by oxidation of the food product can occur. In the case of orange cups, such degradation is indicated by the color of the comminuted precursor changing from a bright yellow to a mustard yellow. If more time is required for digestion than comminution, a holding tank can be used for completion of digestion beyond that amount of digestion which occurs in the comminution equipment. Enzyme starters and accelerators such as pepsin can be added to the digester to speed up the digestion of the fruit precursor.

The digestion step serves to convert portions of the fruit precursor which otherwise are undigestable and/or unassimilable by humans into compounds which are digestable and assimilable by humans, thereby rendering the fruit precursor edible. In addition, the digestion step serves to make the fruit precursor palatable. For example, in the case of citrus fruits, the bitter taste is eliminated, and in the case of green bananas, the astringent taste is eliminated. The mechanism for this is complex. In the case of citrus fruits, it has been ascertained that the alkali neutralizes d-limonin, the constituent of citrus fruits believed responsible for the bitter taste of the solids. Furthermore, formation of bitter salts from the majority of the flavonoids of whole citrus residual solids is prevented by the alkaline digesting agent causing a wedge opening cleavage of the d-limonin ring.

In the case of citrus fruits, alkaline digestion not only serves to debitter and stabilize the fruit, but also results in production of a fruit containing at least about 5% available pectin. It is hypothesized that this occurs because of amylolysis of a pectin complex in an alkaline medium, where the pectin complex includes higher carboydrates such as cellulose, hemi-cellulose, and pentosans. It is believed that in the amylolysis of the pectin complex, a reaction takes place which forms a ring of polymerized galactronic acid which is precipitated by trivalent ions of a hydrophilic nature. This available pectin complex allows the fruit product of this process to be used as an inexpensive source of available pectin.

After digestion, the precursor is neutralized in the neutralization stage by changing the pH of the digested precursor with an edible, water-soluble neutralizing agent to about the value of the pH of the comminuted precursor prior to digestion. This is an optional step of the process, but is a preferred step because it serves to reconstitute the flavanoids of the precursor, and to halt degradation of the precursor by enzymatic reactions. Reconstitution of the flavanoids is important for maximum flavor of the food product. The pH is changed to a value that is sufficient to stop degradation by enzymatic reactions, and preferably is in the same range as the pH of the precursor before addition of the digesting agent. Table I presents the preferred pH values to be achieved by addition of the neutralizing agent.

The same chemicals used as a digesting agent can be used as a neutralizing agent. Thus for the alkaline digestion process, the neutralizing agent can be any of the compounds used as a digesting agent for the acidic digestive process such as ascorbic acid. Ascorbic acid is preferred because it enhances the vitamin C content of the product of this invention. Likewise, for an acidic digestive process, the neutralizing agent can be any of the agents suitable for use as the digesting agent in the alkaline digestive process such as sodium bicarbonate.

Subsequently, or simultaneously with neutralization, the precursor is homogenized to provide the product with a smooth, even consistency. This can be effected in a Bower colloid mill or other type of blender. Preferably homogenization and neutralization are effected simultaneously, whereby the neutralizing agent, either added in a pure form or combined with a aqueous medium, is added to the homogenizer. Homogenization can be effected with conventional equipment in from about 3 to about 20 minutes. In the homogenizer, sufficient diluting agent is added to reduce the viscosity of the product to a viscosity in the range of from about 800 to about 1200 cps. Generally, the ratio of diluting agent added in combination throughout the process to the amount of fruit precursor fed to the process is about equal on a volume basis.

The resulting puree varies from about 15 to about 40% solids by weight, depending on the type and particular batch of precursor used. Several methods of use of the product puree are envisioned. For example, the puree can be packaged for distribution to the food industry for incorporation into other food products such as fruit juice. The puree can be combined with other food ingredients, such as soya products, flours and grains, to enhance flavor and dietary properties and these products, and to replace the use of solid sweeteners such as invert sugars or corn syrup solids. By addition to the puree to fruit juices, a "squash" type of drink can be produced, or a fortified "gruel" type of feeding material can be produced.

The puree can be used for bakery-type products by incorporation into breads, cakes, and granola-type products to supply available pectin from the puree, replacing all or a major part of the refined pectin normally required in bakery processes. The puree can also serve to replace use of invert sugars, relying on the fructose content of the puree for sweetening.

If a solid product is desired, the puree can be dried to form a substantially anhydrous product for convenient storage, transportation and use by the food processing industries. Drying can be effected by any number of techniques, including drum-drying, spray-drying, tunnel conveyors, foam-mat type of crystal formation, freeze-drying, jet-zone rapid air processes, infra-red processes, microwave treatments, and conventional air-tray low temperature dehydration. During drying, preferably the temperature of the product is maintained less than about 145° C. to avoid caramelization of the sugars present in the product. Preferably the product is dried to a moisture content of less than about 5% by weight. The dry product can be conveyed to a grinding and packaging room, which preferably has a low humidity as the final product may be hygroscopic.

Drum-drying has been found to be a suitable technique. For drum-drying, digestion of the precursor and homogenization are necessary to insure spreadability of the puree. In addition, for drum-drying, for ease of spreading the puree on the surface of the drum-drying cylinders, it is preferred that the viscosity of the puree be between about 800 and 1200 cps. As described below, certain additives can be added to the puree for effective drum-drying. In drum-drying, the preferred thickness of the dried layer is about 2 mm, which is sufficient to provide body to the solid product, yet results in a fairly even temperature gradient to achieve efficient dehydration and cooking uniformity.

In drum-drying, various feed arrangement methods can be used, including dip, splash or trough applicator rolls to meet specific processing requirements. Pendulum or perforated tube feeds can be used. During the drying, the moisture content of the product should be reduced quickly to avoid degradation of the food value of the product and to prevent oxidation uptake in the produce. The pressure of heating steam in the drum interior should not exceed 5 atmospheres, as higher pressures may result in caramelization of sugars present in the product. The thickness of the sheet produced in the drum-dryers is controlled by the revolution speed. The speed is typically adjusted to provide a flash heated cycle in the order of one minute.

The formed fruit sheet is removed from the barrel of the drum-dryer after allowing the sheet to gather for a few seconds. This forms a crepe-like sheet, which is quickly taken off the drum by a doctor knife blade, to avoid thermal degradation of the product. The reels of the drum-dryer can be equipped to cool the product sheet as quickly as possible. Rapid cooling provides a wrinkled crepe-like effect. An expansion air jet tube providing cool, dry air adjacent the crepe may be used for this purpose. Rapid cooling hardens the mass for flake breaking in conveying to packaging equipment, and protects the finished product from thermal degradation.

Alternately the product can be pulled off the drum while warm and rolled on a reel to provide a curled roll or stick-like structure.

The resultant product from drum-drying can be broken up or otherwise processed into selected size chips, or the product can be pulverized for use as an ingredient for making other foodstuffs. For example, the pulverized powder can be made into bars, or used as fillers in candies or baked goods. Other forms of the product can be made by a baking process other than the surface heating technique of drum-drying. Different flavors can be obtained by mixing of different fruit precursors.

The resultant end product has a high fiber content with substantial vitamins and minerals and available amino acids, yet retains substantial flavors of the original fruit precursors. The food product can comprise on a dry basis from about 70 to about 90% higher carbohydrates, from about 1 to about 7% by weight crude fiber, and greater than about 3% by weight available amino acids, and typically from about 5% to about 7.5% by weight available amino acids. Unless indicated otherwise, all compositional percentages referred to herein are on a dry weight basis. The term "higher carbohydrates" refers to polysaccharides and includes cellulose, hemi-cellulose, starch, hexosans, amylopectin, disaccharides, glycogen, and pentosans.

The available amino acid content of the precursor of the present invention is somewhat surprising, but a very desirable result, since available amino acids are important for nutrition. Fruit-based commercial food products, which typically contain less than 1% available amino acids, are obviously an inferior protein source compared to the food products produced by the process of the present invention.

All compositions reported herein are determined by standard AOAC (Association of Americal Chemists) methods, unless indicated otherwise.

Additives can be combined with the precursor during any step of the process. Exemplary of such additives are extenders and fillers such as carbohydrate food products which have a high cellulosic content and fiber content, thereby increasing the overall fiber content of the finished food product. Gluten content in a carbohydrate filler has a tendency to help agglomerate the mixture upon drying and dehydration. Suitable carbohydrate fillers are maize meal, wheat flour, soya flour, brans, or other selected carbohydrate organic material. The quantity and type of filler used are selected to prevent substantial masking of the natural flavors of the fruit.

Soya protein isolate or other bean derivative is a preferred extender to add to the fruit precursor. This is because the addition of soya isolate increases protein and nitrogen availability, thereby improving the nutritive value of the food product. Soya isolate also acts as an emusifier and aids in the dehydration of the puree, by acting as a nitrogen-available compound which serves as an antioxidant during drying. This allows higher temperatures during the drying step for quicker drying with less oxidation of the digested and neutralized precursor. The antioxidant effect of soya isolate is believed a result of free nitrogen of the soya isolate reacting with potassium ions creating a fixative position which minimizes further oxidation of the precursor. Compounds other than soya isolate can be used for this purpose, such compounds characterized by having a high availability of free nitrogen.

Other advantages of using soya isolate as a filler include the excellent emulsifying properties of soya isolate. Also, soya isolate functions as an encapsulating and solubilizing agent, aiding in the rapid rehydration of the finished product in liquid water. Also, soya isolate can serve to substantially eliminate the uptake of water vapor by the dry, final product.

Preferably soya isolate is added to the process as early as possible, most preferably during the comminution stage, so that advantage can be taken of its antioxidative action early in the process.

Also exemplary of additives which can be added during processing are agglomerating or cohesive agents. As used herein, the terms "agglomerating" and "cohesive agent" refer to sugar-based additives and gums such as xanthan. The cohesive agent can be sugar, glucose, fructose, molasses, honey, or a combination of these ingredients or other sugar-based organic compounds having adhesion and agglomerating characteristics. The particular percentage of agent used is dependent on its adhesion character, the amount required for flavor balance, and also on the Brix content of the fruit pulp.

Non-sugar based adhesive agents can be added to the product to improve its cohesiveness, both in the puree form and as a solid. Exemplary of suitable agents are methylcellulose and certain gums such as xanthan or galactannins including kelp-based gums. Xanthan is preferred.

Other additives can be added including antioxidants, such as sodium metabisulphite, to maintain flavor and color control. Also, ascorbic acid serves as an antioxidant. Addition of sodium metabisulphite is required when processing bananas to avoid excessive oxidation of the banana. For bananas, it is preferred that the sodium metabisulphite be added at least as early as the digestion stage for control of oxidation throughout the entire process.

Among other additives which can be added are sweetness enhancers and extenders such as monoammonium glycyrrhizinate ($C_{42}H_{61}O_{16}NH_4$). Sweetness enhancers serve to maintain taste and allow reduction in the amount of sugar-based additive used. In addition, additives for flavor and aroma enhancement and color maintenance can be included such as lecithin encapsulated flavor additives. Preferably natural flavor additives and natural coloring additives are used. Plain lecithin powders can be added to encapsulate and emulsify natural fruit flavors present in the precursor. Cell forming agents such as dimonoglyceride can be added prior to drying.

When producing a solid food product, the relative quantities of fruit precursor, cohesive agent, and filler vary with the specific fruit parts, the particular filler, and the nature of the cohesive agent. Preferably the filler comprises between about 5 and 50% of the fruit precursor and the cohesive agent comprises between about 1 and about 35% of the weight of the fruit precursor. Use of sugar-based cohesive agent can be substantially reduced toward the 5% figure by the use of gums, particularly in combination with sweetness enhancer. The gums can constitute between about 0.1% and about 5% of the precursor weight. The combined cohesive agent and filler preferably comprise at least 15% by weight of the fruit precursor. The resulting product contains by weight at least 50% fruit precursor, at least 5% carbohydrate additive, and at least 5% agglomerative additive.

Food products of the present invention have many advantages. For example, the food products of the present invention are highly nutritious, are a quick source of energy, have high available amino acid protein content, and in the case of products produced from citrus fruits, have high available pectin content. They also have high fiber content, which is nutritionally desirable as fiber speeds the movement of food through the human digestion tract. High available amino acid content is important because it permits the products of the present invention to be used as a protein source. Because of the available pectin content of food products of the present invention derived from citrus fruits, these products can be used in baking as an inexpensive source of pectin.

In addition, the food products of the present invention can be produced at low cost, because the raw materials either have no value, or a negative value because money must be expanded to dispose of the fruit by-product without contributing to pollution. Furthermore, the products of the present invention are palatable, because the bitterness associated with the fruit precursor is substantially, if not completely eliminated.

These and other advantages and features of the present invention will become better understood with reference to the following examples.

EXAMPLE 1

Table II presents the ingredients used for making a food product using orange cups as the fruit precursor. The orange cups and the extractor/centrifuge semi-solids were fed to a vertical cutter mixer having a blade speed of 3500 rpm and were maintained in the cutter mixer for about six minutes, the comminuted precursor having a pH of about 3.3, a weight average particle size of about 80 mesh, and a viscosity of about 1000 cps. Ambient temperature was 30° C. The sodium bicarbonate was introduced directly to the vertical cutter mixer. The comminuted precursor was maintained in a stainless steel holding tank for about nine minutes. The pH in the digestion tank was about 7.2. From the holding tank, the precursor was passed to a homogenizer, into which all the other ingredients were added, and homogenized for five minutes. The pH of the slurry in the homogenizer, after the addition of the ascorbic acid, was about 3.3.

EXAMPLE 2

The test of Example 1 was repeated, except for some minor differences, as indicated below. In particular, with reference to Table II, the batch formula was different, with the water being replaced by extractor/centrifuge semi-solids, the sodium bicarbonate being replaced by potassium bicarbonate, and the ascorbic acid being replaced by citric acid. Other changes were that the pH of the comminuted precursor before addition of the bicarbonate was 4.2 and after addition of the bicarbonate was 7.5. In addition, comminution was for 9 minutes, digestion in the holding tank lasted for 11 minutes, and homogenization was effected in 20 minutes.

TABLE II

| | Orange Precursor QUANTITY (POUNDS) | |
|---|---|---|
| Ingredient | Example 1 | Example 2 |
| Cups (whole orange residual solids) | 50 | 50 |
| Extractor/Centrifuge Semi-Solids from Orange | — | 21.5 |
| Deionized Water | 21.5 | — |
| Sodium Bicarbonate | 2.5 | — |
| Potassium Bicarbonate | — | 2.5 |
| Soya Isolate Acidic Grade (60% available Nitrogen) | 2.5 | 2.5 |
| Citric Acid | — | 2.5 |
| Ascorbic Acid | 2.5 | — |
| Xanthan Gum (1% Solution) | 10.0 | 10.0 |
| Dimonoglyceride (2.5% Solution) | 10.0 | 10.0 |
| Sodium Metabisulfite (2.5% Solution) | 1.0 | 1.0 |
| Total | 100.0 | 100.0 |

EXAMPLE 3

Products prepared by the methods of Examples 1 and 2 were analyzed, both as puree and a dehydrated product. Analysis of the available amino acid content of the dehydrated product is presented in Table IV.

Representative analysis of product prepared from orange cups is presented in Table III. For comparison, the analysis of commercial juice puree containing juice and pulp and a dehydrated product produced from the commercial juice puree are presented in Table III. Commercial puree data were obtained from USDA No. 8 Agricultural Handbook. The protein analyses presented in Table III for the commercial puree was obtained from literature sources.

As shown by the results presented in Table III, the fruit products of the present invention have substantially higher nutritional value than prior art purees and dehydrated fruit products. In particular, the fruit products of the present invention have higher protein, fiber, calcium, phosphorous, iron, sodium, potassium, magnesium, thiamine, riboflavin, niacin, ascorbic acid, carotene, and available or free amino acid content than the prior art products.

TABLE III

| | | Product Analysis | | | |
|---|---|---|---|---|---|
| | | New Product | | Prior Art | |
| Constituent | % | Finished Product Dehydrated | Puree | Puree Juice/Pulp | Dehydrated Product |
| Moisture content | % by weight | 3.70 | 72.50 | 86.4 | 1.0 |
| Protein | g/100g | 7.72 | 4.88 | .7 | 1.70 |
| Fat ether | g/100g | 1.44 | 1.41 | .2 | .72 |
| Fat acid Hyd. | g/100g | 6.36 | — | — | 1.70 |

TABLE III-continued

| | | Product Analysis | | | |
|---|---|---|---|---|---|
| | | New Product | | Prior Art | |
| Constituent | % | Finished Product Dehydrated | Puree | Puree Juice/Pulp | Dehydrated Product |
| Carbohydrate total | g/100g | 84.30 | 48.99 | 12.2 | 88.90 |
| Fiber crude | g/100g | 4.30 | 1.91 | .5 | .80 |
| Ash | g/100g | 3.57 | 1.83 | .6 | 3.40 |
| Food Energy | Calories | 524.00 | 120.00 | 49.0 | 380.00 |
| Reducing sugars | Wt. % | 36.6 | 10.3 | 5.4 | 28.3 |
| Acidity as citric | Wt. % | 3.2 | 1.99 | .94 | 2.6 |
| Pectin | Wt. % | 6.88 | 3.06 | — | — |
| Pectic acid | Wt. % | 1.10 | .30 | — | — |
| Calcium | mg/100g | 225.00 | 161.00 | 41.00 | 84.00 |
| Phosphorus | mg/100g | 1910.00 | 564.00 | 17.00 | 134.00 |
| Iron | mg/100g | 40.7 | 23.00 | .2 | 1.7 |
| Sodium | mg/100g | 129.00 | 41.00 | 3.0 | 8.0 |
| Potassium | mg/100g | 4800.00 | 2040.00 | 206.0 | 1728.0 |
| Magnesium | mg/100g | 600.00 | 305.00 | 29.0 | 162.0 |
| Thiamine | mg/100g | 2.45 | 1.45 | .12 | .67 |
| Riboflavin | mg/100g | .59 | .55 | .04 | .21 |
| Niacin | mg/100g | 10.80 | 2.28 | .40 | 2.90 |
| Ascorbic Acid | mg/100g | 1307.00 | 636.00 | 45.00 | 2.90 |
| Carotene | International Units | 2240.00 | 565.00 | 190.00 | 1680.00 |
| Amino Acids (free) | Wt. % | 7.34 | 5.4 | — | — |
| Aspartic | gm/100g | — | 0.82 | 0.054 | — |
| Glutamic | gm/100g | — | 1.46 | 0.078 | — |
| Alanine | gm/100g | — | 0.38 | 0.026 | — |
| Serine | gm/100g | — | 0.38 | 0.040 | — |

TABLE IV

Amino Acid Profile of Dehydrated Orange Puree

| Amino Acid | Content (gm/100gm) |
|---|---|
| ASPARTIC | 0.82 |
| GLUTAMIC | 1.46 |
| ALANINE | 0.38 |
| ISOLEUCINE | 0.28 |
| PHENYLALANINE | 0.35 |
| AMMONIA | 0.20 |
| THREONINE | 0.25 |
| PROLINE | 0.59 |
| VALINE | 0.34 |
| LEUCINE | 0.63 |
| HISTIDINE | 0.39 |
| ARGININE | 0.47 |
| SERINE | 0.38 |
| GLYCINE | 0.30 |
| METHIONINE | 0.08 |
| TYROSINE | 0.10 |
| LYSINE | 0.32 |

EXAMPLE 4

Table V presents the ingredients used for making a food product using green whole bananas as the fruit precursor. The bananas and water were fed to a vertical cutter mixer having a blade speed of 3500 rpm and were maintained in the cutter mixer for about six minutes, the comminuted precursor having a pH of about 5.2, a weight average particle size of about 80 mesh, and a viscosity of about 1000 cps. Comminution was effected at ambient temperature of 30° C. The sodium bicarbonate was introduced directly to the vertical cutter mixer. Pepsin anhydrous and enzyme starter were added to the vertical cutter mixer to accelerate and initiate enzymatic digestion. The comminuted precursor was maintained in a stainless steel holding tank for about nine minutes. The pH in the digestion tank was about 8.2. From the holding tank, the precursor was passed to a homogenizer, into which all the other ingredients were added, and homogenized for five minutes. The pH of the slurry in the homogenizer after addition of the ascorbic acid was about 5.2.

EXAMPLE 5

Table V presents the ingredients used for making a food product using ripe bananas as the fruit precursor. The bananas and water were fed to a vertical cutter mixer having a blade speed of 3500 rpm and were maintained in the cutter mixer for about six minutes, the comminuted precursor having a pH of about 5.2, a weight average particle size of about 80 mesh, and a viscosity of about 1000 cps. Ambient temperature was 30° C. The lactic acid, enzyme starter, and sodium bicarbonate were introduced directly to the vertical cutter mixer. The comminuted precursor was maintained in a stainless steel holding tank for about nine minutes. The pH in the digestion tank was about 2.9. From the holding tank, the precursor was passed to a homogenizer, into which all the other ingredients were added, and homogenized for five minutes. The pH of the slurry in the homogenizer after addition of the sodium bicarbonate was about 5.2.

TABLE V

| INGREDIENT | QUANTITY (POUNDS) | | | |
|---|---|---|---|---|
| WHOLE BANANA | (green) | 50.0 | (ripe) | 50.0 |
| H₂O Deionized | | 22 | | 17.5 |
| Lactic Acid | | — | | 2.5 |
| Sodium Metabisulfite | | — | | 5.0 |

TABLE V-continued

| INGREDIENT | QUANTITY (POUNDS) | |
|---|---|---|
| (2.5% soln) | | |
| Sodium Bicarbonate | 1.0 | 1.5 |
| Pepsin Anhydrous | 1.0 | — |
| Enzyme Starter* | 1.0 | 1.0 |
| Soya Isolate | 2.5 | 2.5 |
| (acid grade, neutral grade) | | |
| Dimonoglyceride (2.5% soln) | 10.0 | 10.0 |
| Xanthan Gum (7.1% soln) | 10.0 | 10.0 |
| Ascorbic Acid | 2.5 | — |
| | 100.0 | 100.0 |

*Clarise from Miles Laboratory

EXAMPLE 6

Products prepared by the methods of Examples 4 and 5 were analyzed, both as puree and a dehydrated product. Analysis of the available amino acid content of the dehydrated product is presented in Table VI.

Representative analysis of product prepared from bananas is presented in Table VII. For comparison, the analysis of commercial banana puree and a dehydrated banana product are presented in Table VII.

As shown by the results presented in Table VII, the fruit products of the present invention have substantially higher nutritional value than prior art purees and dehydrated fruit products. In particular, the fruit products of the present invention have higher protein, fiber, calcium, phosphorous, iron, sodium, potassium, magnesium, thiamine, riboflavin, niacin, ascorbic acid, and carotene content than the prior art products.

TABLE VI

ANALYSES OF BANANA PRODUCTS

Protein Assay:
Units are in gm/100 gm

| | |
|---|---|
| GLYSINE | 0.296 |
| ASPARTIC | 0.710 |
| GLUTAMIC | 1.410 |
| ALANINE | 0.387 |
| ISOLEUCINE | 0.320 |
| PHENYLALANINE | 0.350 |
| AMMONIA | 0.163 |
| THREONINE | 0.239 |
| PROLINE | 0.433 |
| VALINE | 0.312 |
| LEUCINE | 0.640 |
| HISTIDINE | 0.200 |
| ARGININE | 0.306 |
| SERINE | 0.339 |
| METHIONINE | 0.085 |
| TYROSINE | 0.091 |
| LYSINE | 0.146 |
| TOTAL | 6.427 |

TABLE VII

Product Analysis

| | | New Product | | Prior Art (Flesh Only) | |
|---|---|---|---|---|---|
| Constituent | % | De-hydrated | Puree | De-hydrated | Puree |
| Moisture | % by weight | 2.67 | 69.30 | 3.0 | 75.7 |
| Protein | g/100g | 7.35 | 3.90 | 4.4 | 1.1 |
| Fat ether | g/100g | 1.50 | .60 | .8 | .2 |
| Fat acid hyd. | g/100g | 4.40 | 2.10 | — | — |
| Carbohydrate | g/100g | 85.50 | 58.27 | 88.6 | 22.2 |
| Fiber crude | g/100g | 1.90 | 2.20 | .2 | .5 |
| Ash | g/100g | 5.82 | 1.40 | 3.2 | .8 |
| Food Energy | Calories | 730.00 | 187.00 | 340.0 | 85.0 |
| Reducing Sugar | % by | 36.90 | 15.12 | 3.3 | 1.9 |

TABLE VII-continued

Product Analysis

| | | New Product | | Prior Art (Flesh Only) | |
|---|---|---|---|---|---|
| Constituent | % | De-hydrated | Puree | De-hydrated | Puree |
| | weight | | | | |
| Calcium | mg/100g | 120.00 | 29.0 | 32.0 | 8.0 |
| Phosphorus | mg/100g | 183.00 | 48.0 | 104.0 | 26.0 |
| Iron | mg/100g | 3.70 | 1.1 | 2.8 | .7 |
| Sodium | mg/100g | 7.90 | 2.3 | 4.0 | 1.0 |
| Potassium | mg/100g | 1890.00 | 465.0 | 1477.0 | 370.0 |
| Magnesium | mg/100g | 77.80 | 106.0 | 13.20 | 33.0 |
| Thiamine | mg/100g | .33 | 1.3 | .18 | .05 |
| Riboflavin | mg/100g | .46 | .9 | .24 | .06 |
| Niacin | mg/100g | 3.90 | 1.2 | 2.80 | .70 |
| Carotene | International Units | 2725.00 | 414.0 | 760.00 | 190.00 |
| Ascorbic Acid | mg/100g | 2.40 | .9 | .70 | .10 |
| Acidity as Citric | % by weight | 1.76 | | | |
| Amino Acids (free) | % by weight | 6.42 | 3.5 | | |

Although this invention has been described in considerable detail with reference to certain versions thereof, other versions are within the scope of this invention. Therefore, the spirit and scope of the appended claims should not necessarily be limited to the prescription of the preferred versions contained herein.

What is claimed is:

1. A method for preparing a palatable and edible food product for human consumption from a fruit precursor comprising substantially non-edible and substantially non-palatable portions of a fruit selected from the group consisting of citrus fruits, pineapple, banana, papaya, mango, and combinations thereof, the fruit precursor containing amylytic enzymes and cells, the method comprising the steps of:

(a) comminuting the precursor to a weight average particle size of less than about 40 mesh, the comminuted precursor having a pH of about 1.9 to about 5.2;

(b) digesting the comminuted precursor by combining an edible, water-soluble digesting agent with the comminuted precursor for adjusting the pH of the precursor to a value at which the precursor cells rupture and amylytic enzymes in the precursor are active; and (c) neutralizing the digested precursor by changing the pH of the digested precursor with an edible, water-soluble neutralizing agent to about the value of the pH of the comminuted precursor prior to digestion.

2. The method of claim 1 in which the steps of comminuting and digestng are effected simultaneously.

3. The method of claim 1 including the step of homogenizing the precursor simultaneously with the step of neutralizing the precursor.

4. The method of claim 3 including the step of adding a diluting agent comprising water while neutralizing and homogenizing the precursor to reduce the viscosity of the the digested precursor.

5. The method of claim 1 including the step of adding a diluting agent comprising water to the neutralized precursor for reducing the viscosity of the precursor.

6. The method of claim 1 in which the precursor is digested for from about 4 to about 14 minutes.

7. The method of claim 1 in which the precursor is digested in a substantially oxygen free atmosphere.

8. The method of claim 1 in which the precursor is comminuted in a substantially oxygen free atmosphere.

9. A method for preparing a palatable and edible food product for human consumption from a fruit precursor comprising substantially non-edible and substantially non-palatable portions of a fruit selected from the group consisting of citrus fruits, pineapple, green banana, and mango including the seed, the fruit precursor containing amylytic enzymes and cells, the method comprising the steps of:
 (a) comminuting the precursor to a weight average particle size of from about 40 to about 120 mesh, the comminuted precursor having a pH of about 1.9 to about 5.2;
 (b) digesting the comminuted precursor by combining a sufficient amount of an edible, water-soluble, alkaline digesting agent with the comminuted precursor for raising the pH of the precursor to a value greater than 7 and up to about 8.2; and
 (c) neutralizing the digested precursor by changing the pH of the digested precursor with an edible, water-soluble, acidic neutralizing agent to about the value of the pH of the comminuted precursor prior to digestion.

10. The method of claim 9 in which the neutralizing agent comprises an edible organic acid.

11. The method of claim 10 in which the digesting agent comprises sodium bicarbonate.

12. The method of claim 9 in which the digesting agent comprises sodium bicarbonate.

13. The method of claim 9 in which the fruit is citrus fruit and the step of neutralizing comprises changing the pH of the digested precursor to a value of about 2.6 to about 3.3.

14. The method of claim 9 in which the fruit is green banana and the step of neutralizing comprises changing the pH of the digested precursor to a value of about 5.2.

15. The method of claim 9 in which the fruit is mango with seed and the step of neutralizing comprises changing the pH of the digested precursor to a value of about 4.3.

16. The method of claim 9 in which the fruit is pineapple and the step of neutralizing comprises changing the pH of the digested precursor to a value of about 1.9 to about 3.8.

17. A method for preparing a palatable and edible food product for human consumption from a fruit precursor comprising substantially non-edible and substantially non-palatable portions of a fruit selected from the group consisting of ripe banana and mango without the seed, the fruit precursor containing amylytic enzymes and having cells comprising cellulose, the method comprising the steps of:
 (a) comminuting the precursor to a weight average particle size of from about 40 to about 120 mesh, the comminuted precursor having a pH of about 1.9 to about 5.2;
 (b) digesting the comminuted precursor by combining an edible, water-soluble, acidic digesting agent with the comminuted precursor for lowering the pH of the precursor to a value of from about 2.9 to about 3.9; and
 (c) neutralizing the digested precursor by changing the pH of the digested precursor with an edible, water-soluble, alkaline neutralizing agent to about the value of the pH of the comminuted precursor prior to digestion.

18. The method of claim 17 in which the neutralizing agent comprises sodium bicarbonate.

19. The method of claim 18 in which the digesting agent comprises an edible organic acid.

20. The method of claim 17 in which the digesting agent comprises an edible organic acid.

21. The method of claim 17 in which the fruit is ripe banana and the step of neutralizing comprises changing the pH of the digested precursor to a value of about 5.2.

22. The method of claim 21 in which the neutralizing agent comprises sodium bicarbonate.

23. The method of claim 20 in which the fruit is banana and including the steps of treating the comminuted precursor with an antioxidant.

24. The method of claim 23 in which the antioxidant is sodium metabisulfite.

25. The method of claim 17 in which the fruit is mango without the seed and the step of neutralizing comprises changing the pH of the digested precursor to a value of about 2.9 to about 3.9.

26. A method for preparing a palatable and edible food product for human consumption from a fruit precursor comprising substantially non-edible and substantially non-palatable portions of papaya, the fruit precursor containing amylytic enzymes and having cells, the method comprising the steps of:
 (a) comminuting the precursor to a weight average particle size of from about 40 to about 120 mesh, the comminuted precursor having a pH of about 3.8;
 (b) digesting the comminuted precursor by combining an edible, water-soluble, acidic digesting agent with the comminuted precursor for lowering the pH of the precursor to a value of from about 2.5 to about 3.7; and
 (c) neutralizing the digested precursor by changing the pH of the digested precursor with an edible, water-soluble, alkaline neutralizing agent to about 3.8.

27. An edible and palatable fruit product suitable for human consumption and prepared from a fruit precursor comprising substantially non-edible and substantially non-palatable portions of a fruit selected from the group consisting of citrus fruits, pineapple, banana, and mango, the food product prepared by drying the neutralized precursor of claim 1.

28. An edible and palatable fruit product suitable for human consumption and prepared from a fruit precursor comprising substantially non-edible and substantially non-palatable portions of a fruit selected from the group consisting of citrus fruits, pineapple, green banana, and mango with seed, the food product prepared by drying the neutralized precursor of claim 9.

29. An edible and palatable fruit product suitable for human consumption and prepared from a fruit precursor comprising substantially non-edible and substantially non-palatable portions of green banana, the food product prepared by drying the neutralized precursor of claim 14.

30. An edible and palatable fruit product suitable for human consumption and prepared from a fruit precursor comprising substantially non-edible and substantially non-palatable portions of mango with seed, the food product prepared by drying the neutralized precursor of claim 15.

31. An edible and palatable fruit product suitable for human consumption and prepared from a fruit precursor comprising substantially non-edible and substantially non-palatable portions of pineapple, the food product prepared by drying the neutralized precursor of claim 16.

32. An edible and palatable fruit product suitable for human consumption and prepared from a fruit precursor comprising substantially non-edible and substantially non-palatable portions of a fruit selected from the group consisting of ripe banana and mango without seed, the food product prepared by drying the neutralized precursor of claim 17.

33. An edible and palatable fruit product suitable for human consumption and prepared from a fruit precursor comprising substantially non-edible and substantially non-palatable portions of ripe banana, the food product prepared by drying the neutralized precursor of claim 21.

34. An edible and palatable fruit product suitable for human consumption and prepared from a fruit precursor comprising substantially non-edible and substantially non-palatable portions of mango without seed, the food product prepared by drying the neutralized precursor of claim 25.

35. An edible and palatable fruit product suitable for human consumption and prepared from a fruit precursor comprising substantially non-edible and substantially non-palatable portions of papaya, the food product prepared by drying the neuturalized precursor of claim 26.

36. The method of claim 9 in which the fruit is a citrus fruit and contains d-limonin, wherein the precursor is digested for a sufficient time to neutralize a substantial portion of the d-limonin.

37. The method of claim 1 in which the precursor is digested to contain from about 6 to about 12% by weight fructose.

* * * * *

UNITED STATES PATENT AND TRADEMARK OFFICE
CERTIFICATE OF CORRECTION

PATENT NO. : 4,267,196

DATED : May 12, 1981

INVENTOR(S) : Ian F. Johnston

It is certified that error appears in the above—identified patent and that said Letters Patent is hereby corrected as shown below:

In the specification: Column 3, line 8, "percursor" should be --precursor--; Column 3, lines 23 and 24, "proteolvsis" should be --proteolysis--; Column 4, line 36, "comminutation" should be --comminution--; Column 7, line 4, "and-" should be --and--; Column 8, line 13, "and" second occurrence should be --of--; Column 8, line 16, "to" first occurrence should be --of--; Column 8, line 67, "heated" should be --heating--.

In the claims: Claim 6, Column 16, line 68, "4 to about 14" should be --5 to about 15--.

Signed and Sealed this

Twenty-fifth Day of August 1981

[SEAL]

Attest:

Attesting Officer

GERALD J. MOSSINGHOFF

Commissioner of Patents and Trademarks